April 19, 1932. H. E. RINEHART 1,854,382
AUTOMATIC COUPLING FOR AIR, WATER, AND STEAM
HOSE PRIMARILY INTENDED FOR RAILROAD USE
Filed Sept. 9, 1929  3 Sheets-Sheet 1
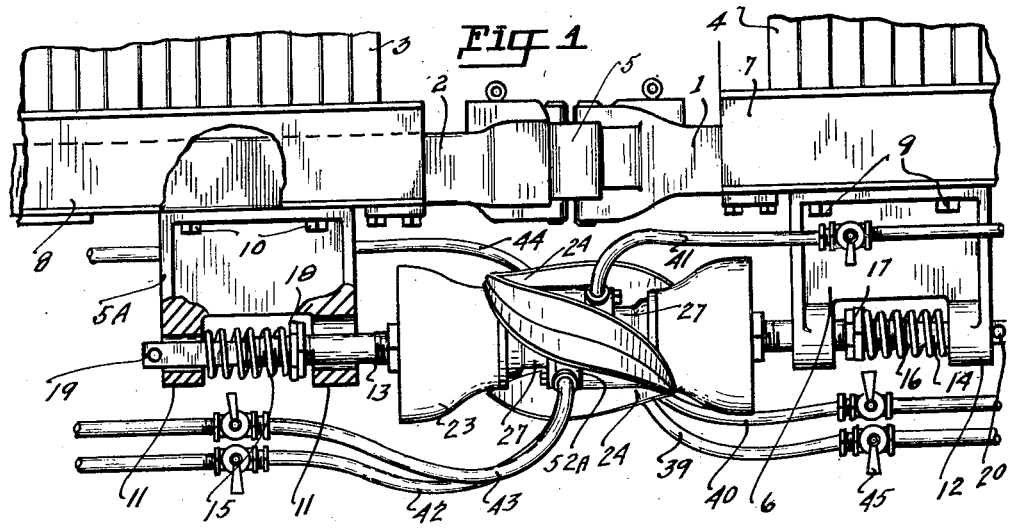
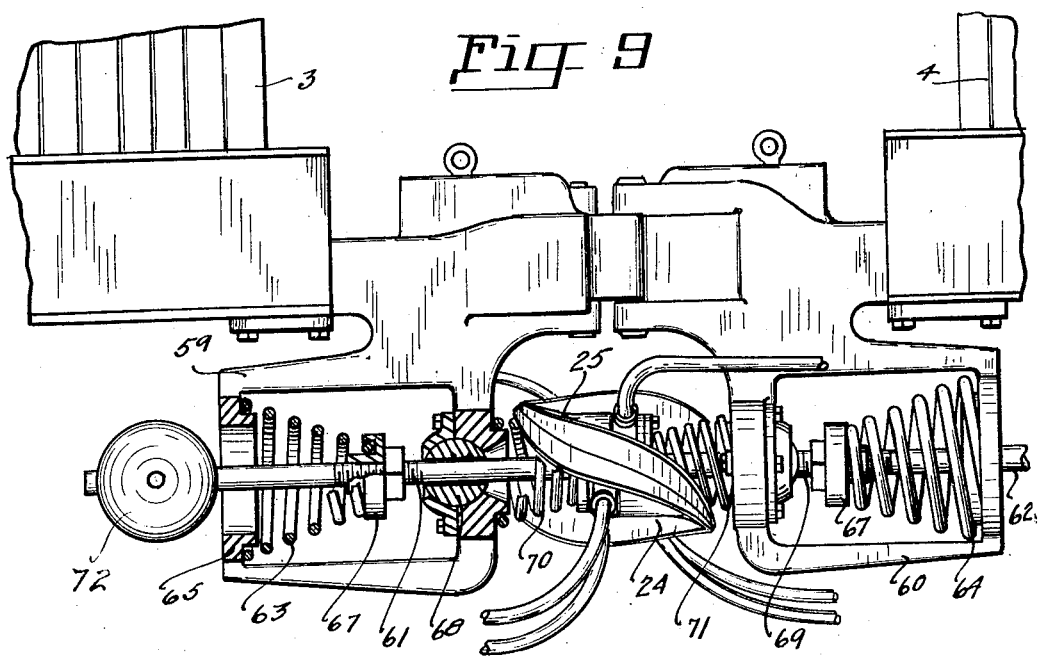
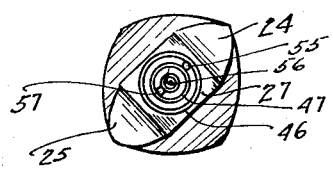
Harvey E. Rinehart
INVENTOR
BY
ATTORNEY

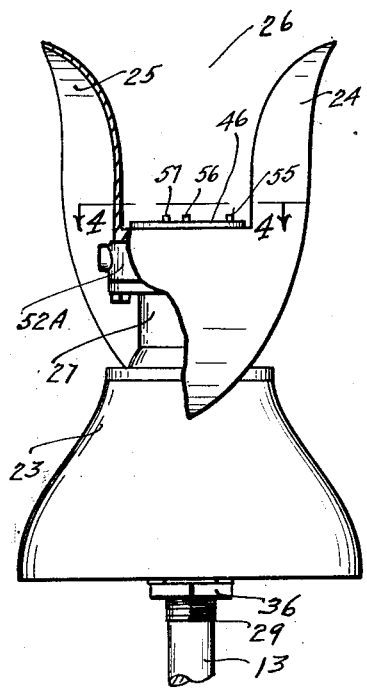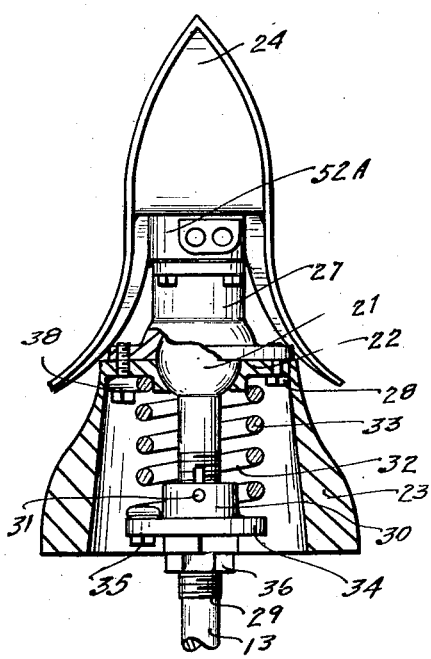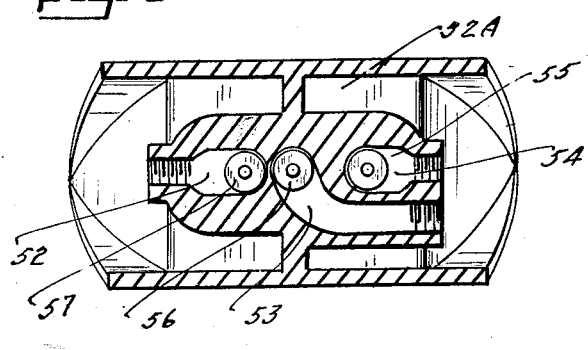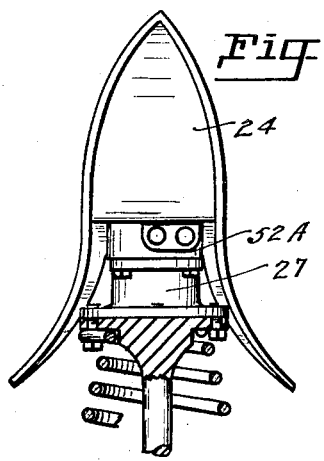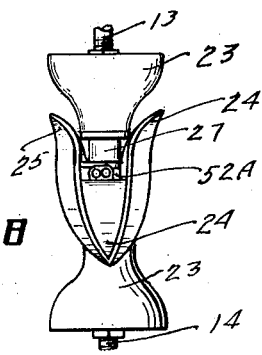

April 19, 1932.  H. E. RINEHART  1,854,382
AUTOMATIC COUPLING FOR AIR, WATER, AND STEAM
HOSE PRIMARILY INTENDED FOR RAILROAD USE
Filed Sept. 9, 1929  3 Sheets-Sheet 3

Harvey E. Rinehart
Inventor

Attorney

Patented Apr. 19, 1932

1,854,382

UNITED STATES PATENT OFFICE

HARVEY E. RINEHART, OF WHEELER, OREGON

AUTOMATIC COUPLING FOR AIR, WATER, AND STEAM HOSE PRIMARILY INTENDED FOR RAILROAD USE

Application filed September 9, 1929. Serial No. 391,476.

The primary purpose of my new and improved coupling is for use upon railroad equipment and has for its object the making and breaking, automatically, of connections of the air, steam and water lines commonly in use in railroad equipment. Such a coupling as I have invented eliminates the necessity of manually fastening and unfastening the various air, steam and water hose by members of the train crew. The operation is accomplished automatically and simultaneously with the coupling and uncoupling of the cars.

The device consists primarily of heads which have passageways disposed therein. The heads have connections with the fluid holding lines leading from a source of supply upon their one end and conducting the fluid under pressure from the source of supply to the full length of the train. When any part of the train is removed by uncoupling, the lines will simultaneously be automatically uncoupled and a tight joint will be created and maintained to prevent the outward flow of the fluids under pressure through the coupling heads.

The primary purpose of my device is to eliminate the hazard in train operation to members of the train crew who are now required to go beneath the train to connect or disconnect the air, steam and water lines.

A further object of my invention consists in providing simple and efficient coupling means, through the use of which, a great deal of time will be saved in the operation of trains; time being required by the manual coupling or uncoupling of the air, water and steam lines from one car to the adjacent car composing the train or from the locomotive to the adjacent car composing the train.

A further object of my new and improved device resides in providing simple and efficient means for automatically making and breaking the air, water and steam lines of railroad equipment. The device is so constructed as to be efficient and long-lived in its operation. It is made to be relatively free from mechanical operating troubles, rugged in its construction, automatic in its operation and has compensating means for unevenness in track alignment and curvature, and a coupling that may be used at either end of the car with equal facility.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side elevation, partially in section, of a pair of my devices shown coupled together.

Fig. 2 is a side elevation, partially in section, of a standard coupling head.

Fig. 3 is a sectional, side view of one end of the head.

Fig. 6 is a sectional, end view of the mechanism illustrated in Figs. 4 and 5 the same being taken on line 6—6 of Fig. 5, looking in the direction indicated.

Fig. 7 is an end view of one of the heads shown uncoupled, the same made as a plan view of one of the head elements.

Fig. 8 is a side view of a pair of coupled heads shown engaged with each other and assembled.

Fig. 9 is a side elevation, partially in section, of a modified form of a pair of the heads shown engaged with each other and illustrating the compressible elements for maintaining the heads in compressible engagement with each other to maintain a relatively fluid tight connection for the transmitting of compressible fluids therethrough while under pressure.

Fig. 10 is a fragmentary, sectional, side view of one of the head elements.

Like reference characters refer to like parts throughout the several views.

Figure 4:
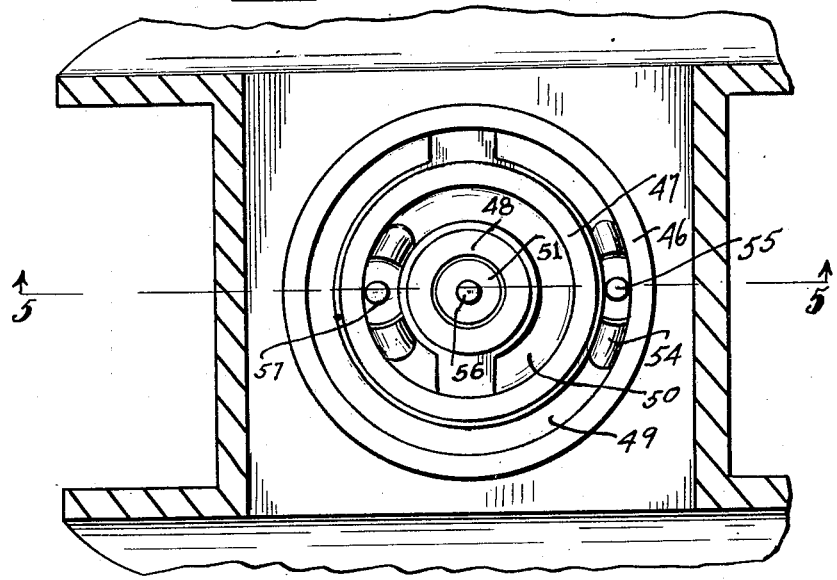
Fig. 4 is a fragmentary, sectional, end view of one end of the head structure, the same being taken on line 4—4 of Fig. 2, looking in the direction indicated.

I have illustrated in Fig. 1, the preferred embodiment of my device and I have illustrated the same coupled together for transmission of fluids under pressure, the same being used for the transmission of three separate and independent fluids as air, water and steam. The coupler bars 1 and 2 are shown at the meeting ends of adjacent cars 3 and 4 with the automatic coupling device being illustrated at 5 for coupling and uncoupling the draw bars of respective and adjacent cars. I place supporting frames 5A and 6 beneath the frames 7 and 8 of the cars. I place my device in vertical alignment with the coupler connections for coupling the respective cars together and the same are removably secured to the beams by any suitable fastening means as by bolts 9 and 10. Supporting lugs 11 and 12 downwardly extend from the body elements 5A and 6. Stems 13 and 14 pass through the lugs with compressible elements 15 and 16 disposed about the stems. One end of the compressible element rests upon adjustable supports 17 and 18 disposed upon the stems and the oppositely disposed end of the compressible element rests against the inner surface of one of the lugs 11 or 12 downwardly extending from the body element and through which one end of the stem 13 or 14 passes. The compressible element is placed within its seat under pressure and locking pins 19 and 20 pass through the ends of the stem and rest upon and engage the outer surface of the lugs 11 and 12 so that the stem is maintained in position with the compressible elements under compression sufficient to normally maintain the stems 13 and 14 outwardly extending. The free ends of the stems 13 and 14 are preferably made square and the holes in the frame through which the same pass are preferably made square thereby preventing the turning of the stems within their supports. The holes through which the stems pass in the respective bosses are preferably made somewhat larger than the stems themselves in order to give a freedom of movement of the stems through the bosses to compensate for track alignment and curvature. The inner end of each of the stems 13 and 14 preferably terminates in a ball section 21. The ball 21 as illustrated in Fig. 3 engages on its inner side with the cross plate 22. The cross plate 22 is in reality the end of the body element that has a ball shaped, counterbalanced end 23. The purpose in counterbalancing the head is to normally maintain the projecting head engaging portion of the device in balanced alignment.

Figure 5:
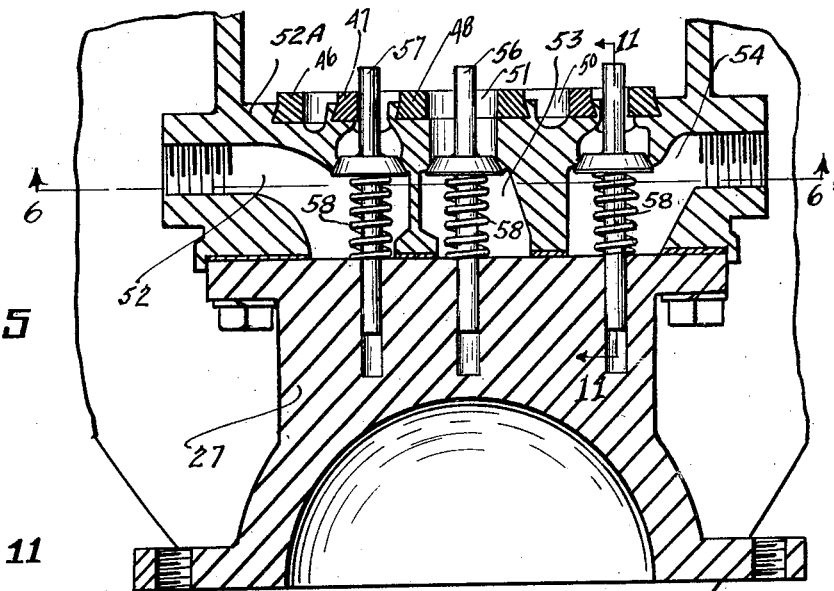
Fig. 5 is a fragmentary, sectional, side view of the assembled device, the same being taken on line 5—5 of Fig. 4 looking in the direction indicated.
Figure 11:
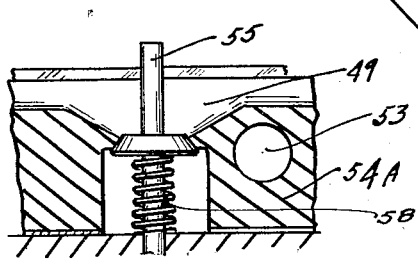
Fig. 11 is a fragmentary, sectional, side view of one of the valves disposed and seated within the head, the same being taken on line 11—11 of Fig. 5 looking in the direction indicated.

I preferably form each of the engaging heads of two outwardly disposed engaging head elements 24 and 25. The ends 24 and 25 of one set preferably lie in a horizontal plane and the ends of the other set lie in a vertical plane. The surfaces of each are so arranged as to facilitate the engagement of one with the other as illustrated in Fig. 8. The engaging heads are connected to the ball shaped counterbalanced body member by a central connecting piece 27, a receiving socket being formed for the ball 21 by the cross plate 22 and the central section 27. The members 21 and 27 are secured together by any suitable fastening means as by bolts 28 thereby maintaining the head in position and placement about the ball and the stem. The stem is threaded at 29 and an adjustable seat 30 is placed about the stem. The hub at the seat 30 has a pin 31 extending through one side wall and extends into and engages within a keyway, or guideway, 32 disposed within the outer surface of the stem. A spring 33 is secured and rests upon the seat 30 and is preferably secured to the flange 34 of the seat by any suitable fastening means as by a bolt 35. The seat may be positioned longitudinally of the stem by locking nuts 36 and 37 to impart a proper and desired compression within the compressible element 33. The compressible element, as a spring, is seated upon the inner surface of the cross plate 22 and is secured thereto by any suitable fastening means as by a cap screw 38. The primary purpose and object of the spring 33 is to maintain the outwardly extending portion of the head in substantial horizontal alignment and the purpose of the ball and socket connection is to permit a movement of the head relative to that of the stem to compensate for uneven track alignment and curvature. Referring again to Fig. 1, lines 39, 40 and 41 conduct fluids under pressure into one of the heads and lines 42, 43, and 44 conduct the fluids under pressure from the head. Valves 45 are disposed in each of the lines for shutting off the flow of fluid through the lines when desired. Referring to Figs. 4 and 5, the engaging faces of each of the heads have receiving rings into which gaskets 46, 47 and 48 are disposed with annular distributing surfaces 49, 50 and 51 disposed therebetween so that the fluid under pressure may flow through the respective engaging annular rings that are disposed in registerable alignment with each other when the engaging surfaces are in contact. The pressure developed by the springs 15 and 16 determines the amount of pressure that is exerted upon the engaging surfaces when the contacts are completed and the heads are coupled together by the draw bars of the adjacent cars. The lines for conducting the fluids under pressure are secured to the chest 52A by threaded engagement and each of the lines conducting the fluids under pressure are connected to the respective chest compartments 52, 53 and 54. Valves 55, 56 and 57 are disposed and seated within the respective chest compartments with the outer end of the valve stems extending beyond the engaging surfaces. Compressible elements 58, as springs, are disposed about each valve stem for normally maintaining the valves seated within the chest compartment and chest structure. When the coupler connection is completed between the adjacent cars, the outwardly extending ends of the valve stems engage metallic surfaces and unseat the valves and compress the springs disposed about the valve stems thereby permitting a free flowing of the compressible fluids under pressure through the respective heads and into the lines extending therebeyond.

A modified form of structure may be made as illustrated in Fig. 9 wherein the supporting frames 59 and 60 are formed integral with the draw bar connections and wherein the stems 61 and 62 are disposed within the depending frame support downwardly extending from the draw bars and wherein compressible elements 63 and 64 are disposed about the respective stems. One end of the compressible elements rests upon a seat 65 adapted to receive the same upon its one end and the oppositely disposed end rests upon the adjustable seat 66. The stem passes through a ball and socket joint 68 or 69 and the head extends therethrough into the engaging heads, forming the connection. Springs 70 and 71 normally maintain the heads in substantial horizontal alignment similar to that heretofore described. An adjustable counterbalance 72 is placed upon each of the stems 68 and 69 for supporting the extending head structure.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described the combination of a frame, a pair of supporting lugs depending from the frame, each of said lugs having an opening therein, one opening being square in cross section and the other opening being round and of greater area in cross-section than the first, a stem slidably disposed within the lugs, spring means disposed about the stem and between the lugs for maintaining the stem normally outwardly extended, a ball disposed upon the extended end of the stem, a counterbalanced member having a socket forming opening disposed about the ball, and a central connecting piece having a socket disposed therein disposed about the ball, an engaging head disposed upon the outer end of the central section, said central connecting element adapted to form an articulating connection between the ball of the stem and the engaging head, a plurality of passageways disposed within the head, and means for conducting fluids under pressure from the passageways disposed within the head.

2. In a device of the class described, a frame detachably attached to the under side of a railway car, lugs downwardly extending from the frame, holes disposed in registerable alignment within the lugs, a stem adapted for longitudinal movement disposed within the holes, one of the holes being so shaped as to prevent the rotation of the stem, compressible means disposed about the stem for normally maintaining the stem distended against a stop, a ball terminating the outer end of the stem, a socket for receiving the ball, compressible elements disposed about the stem between the ball and a slidable flange disposed about the stem, a bifurcated head detachably attached to the socket forming element, means for counterbalancing the assembly to normally maintain the head and the assembly in substantially horizontal alignment, a chest disposed within the head for conducting fluids under pressure into and away from the head, and valves disposed within the chest.

HARVEY E. RINEHART.